United States Patent [19]
Kotsubo et al.

[11] Patent Number: 5,829,791
[45] Date of Patent: Nov. 3, 1998

[54] INSULATED DOUBLE BAYONET COUPLER FOR FLUID RECIRCULATION APPARATUS

[75] Inventors: Vincent Y. Kotsubo, Sunnyvale; Robert E. Nast, San Jose, both of Calif.

[73] Assignee: Bruker Instruments, Inc., Billerica, Mass.

[21] Appl. No.: 717,298

[22] Filed: Sep. 20, 1996

[51] Int. Cl.⁶ ..................................... F16L 35/00
[52] U.S. Cl. .......................... 285/26; 285/124.1; 285/904
[58] Field of Search .............................. 285/124.1, 124.2, 285/124.3, 124.4, 124.5, 903, 25, 26, 28, 29, 904

[56] References Cited

U.S. PATENT DOCUMENTS

| | | | |
|---|---|---|---|
| 2,980,448 | 4/1961 | Holben | 285/940 X |
| 2,983,506 | 5/1961 | Bertsch et al. | 285/124.1 X |
| 3,195,564 | 7/1965 | Carney et al. | 285/904 X |
| 3,316,931 | 5/1967 | Elrod | 285/124.1 X |
| 3,988,029 | 10/1976 | Gibson | 285/904 X |
| 3,991,587 | 11/1976 | Laskaris | 285/904 X |
| 4,011,732 | 3/1977 | Doherty | 285/904 X |
| 4,113,287 | 9/1978 | Bogatirev et al. | 285/124.4 |
| 4,207,745 | 6/1980 | Pouillange | 285/904 X |
| 5,219,185 | 6/1993 | Oddenino | 285/26 |
| 5,417,459 | 5/1995 | Gray | 285/26 |

FOREIGN PATENT DOCUMENTS

| | | | |
|---|---|---|---|
| 2601117 | 7/1977 | Germany | 285/904 |
| 4107652 | 9/1992 | Germany | 285/904 |

*Primary Examiner*—Dave W. Arola

[57] ABSTRACT

An insulated dual-bayonet connector is provided. The connector provides simple alignment and connection for both fluid tubes of a fluid recirculation system. The connector is especially useful for closed-cycle systems, but is also useful for open-cycle gas systems where it is desired to vent a gas in a desired location remote from the item to be cooled or heated by the gas.

9 Claims, 5 Drawing Sheets

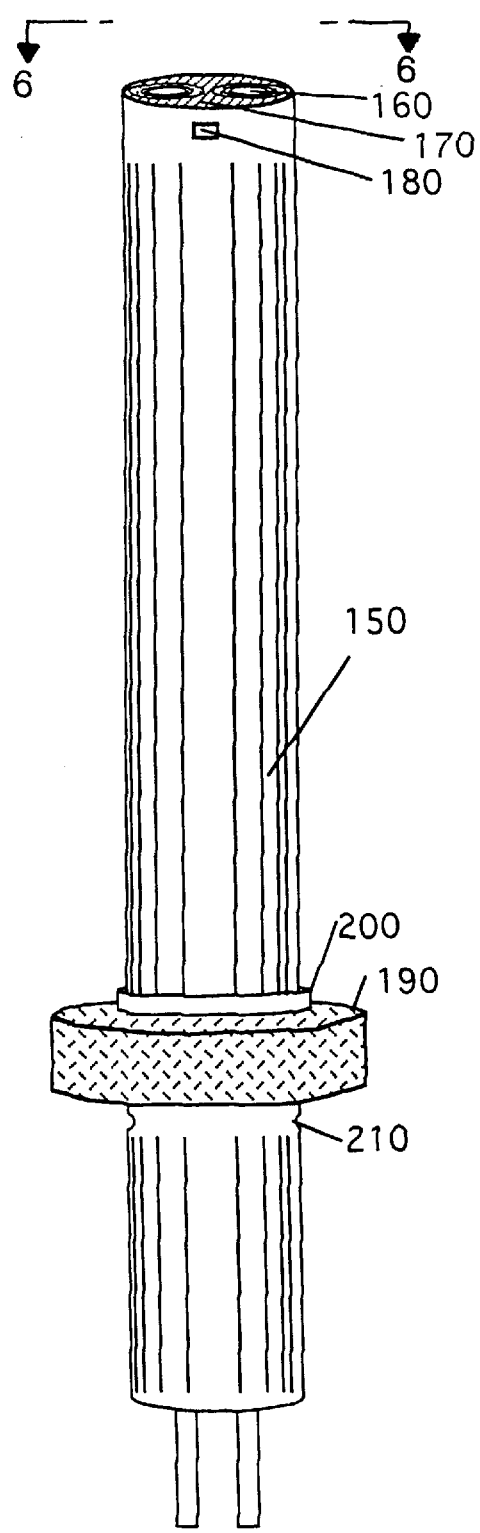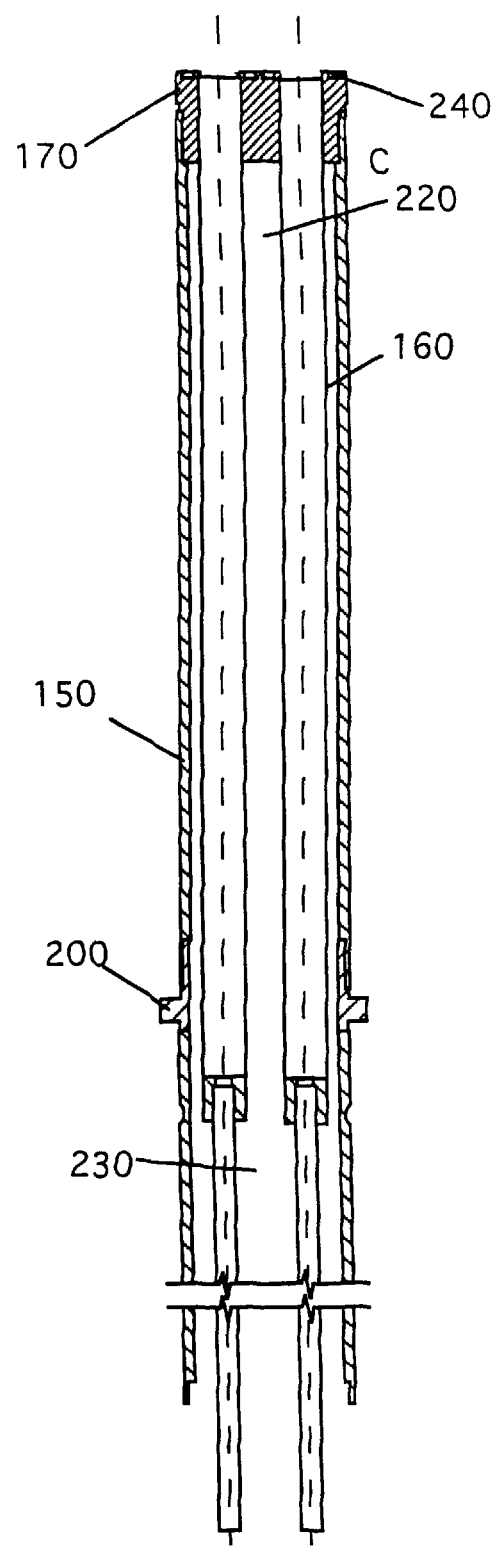

INSULATED DOUBLE BAYONET COUPLER FOR FLUID RECIRCULATION APPARATUS

STATEMENT OF GOVERNMENT INTEREST

The U.S. Government has a paid-up license in this invention and the right in limited circumstances to require the patent owner to license others on reasonable terms as provided for by the terms of Grant No. 5R44RR0957-03 awarded by the National Institutes of Health.

BACKGROUND OF THE INVENTION

1. Field of the Invention

This invention relates to the field of connectors for fluid transfer lines. More particularly, it relates to the field of connectors for fluid transfer lines in which the fluid must be maintained at a temperature different from its surroundings. Even more particularly, it relates to the field of connectors for transfer devices for handling recirculating cryogenic fluids.

2. Description of Related Art

It is sometimes desirable to circulate a fluid through an apparatus at a temperature which differs significantly from ambient temperature. For example, cryogenic fluids are commonly used in refrigeration systems to transfer heat from an object to be cooled. Such systems are commonly used in conjunction with vacuum systems, such as are used in semiconductor manufacture or with cryoelectronic components, where the fluid may be gaseous or liquified nitrogen, helium or other gas. In the area of cryoelectronics, a device may need to be maintained at temperatures of only a few tens of Kelvin. For example, high temperature superconducting electronic devices are typically operated at 20–77K, and require temperatures below 90 K to maintain their superconducting properties. It is known that the performance of conventional electronics may often be improved by low-temperature operation as well.

In some cases, cryoelectronics components may need to be exchanged, either to replace a nonfunctioning component or because the equipment is to be used for differing purposes with differing component requirements. Overall system costs can be reduced if only a single refrigeration system is required for several different, sequentially used cryoelectronic units. In such a case, a connector which provides simple engagement of the refrigeration system to the cryoelectronics, while minimizing the time required to exchange the components, is desired. Where interchangeability is not an issue, it may still be desirable to provide a disconnect between cryogenic electronic units and their refrigeration components for ease of handling.

Recently, superconducting NMR probe assemblies have been introduced which are designed to replace conventional probes in an NMR spectroscopy system. A single system may require several probes to meet the varying demands of the researcher. It may be necessary to exchange probes one or more times in a single day. Similarly, superconductive MRI coils designed to image specific body parts may be interchanged during a single work day and require rapid cool-down. In each of these cases, it is desirable to provide a closed-cycle refrigeration system designed for easy connection and disconnection. These systems operate at temperatures in the range of 20–60 K, and preferably utilize a closed-cycle refrigeration system, with both the superconducting component and the tubes carrying the cooling fluids insulated by vacuum. U.S. Pat. No. 5,508,613 describes a cooling system for such a probe assembly. The "cold-finger" arrangement of that patent places the connection at or within the NMR probe, which may not be the preferred location for the disconnect.

Typically, closed-cycle cryogenic fluid transfer systems have utilized a sealed, closed system. Where open-cycle fluid transfer with venting at the site of delivery is acceptable, a single bayonet mount disconnect may be provided. An alternative for a closed-cycle or return system is to use two separate connectors, but this arrangement is inconvenient, requiring additional effort to effect the connection. Previously, dual bayonet disconnects for vacuum-insulated fluid systems have not been reported.

SUMMARY OF THE INVENTION

Therefore, it is an object of the invention to provide a connector for a vacuum-insulated fluid recirculation system providing insulated supply and return lines in a single connector.

In one embodiment of the invention, two connector halves are provided, each of which includes two vacuum-insulated fluid lines. The connectors are provided with a guide pin and slot to assist in the alignment of the connectors during connection, and are designed such that in use the fluid tubes of one connector assembly ("male") insert into the fluid tubes of the other connector assembly ("female"). The fluid tubes of the female connector assembly are enclosed in a vacuum-insulated space. The male connector assembly includes a sheath which fits over the female connector assembly, providing stability to the entire connector and mechanical protection for the fluid tubes. The connector is elongated to minimize heat loss at the point of connection.

In another embodiment, two or more o-rings are provided on the joining surface of connector to provide room-temperature gas seals around each of the joined fluid tubes.

In another embodiment, guide pins are provided to facilitate insertion of the two fluid lines of the male connector assembly into the corresponding fluid lines of the female connector assembly.

BRIEF DESCRIPTION OF THE DRAWINGS

In the accompanying drawings, in which like numbers represent like parts in the various views:

FIG. 5 depicts the female connector assembly of the invention;

FIG. 6 depicts a longitudinal sectional view of the connector of FIG. 5;

DESCRIPTION OF THE PREFERRED EMBODIMENTS

The double bayonet connector of the invention comprises two parts: a female connector assembly and a male connector assembly. One connector assembly is attached to the refrigeration source, and the other connector assembly to the device to be cooled. Preferably, the connector assemblies are fabricated from a vacuum and weld compatible material, such as stainless steel. Certain components are required to have low thermal conductivity, as well.

Figure 1:
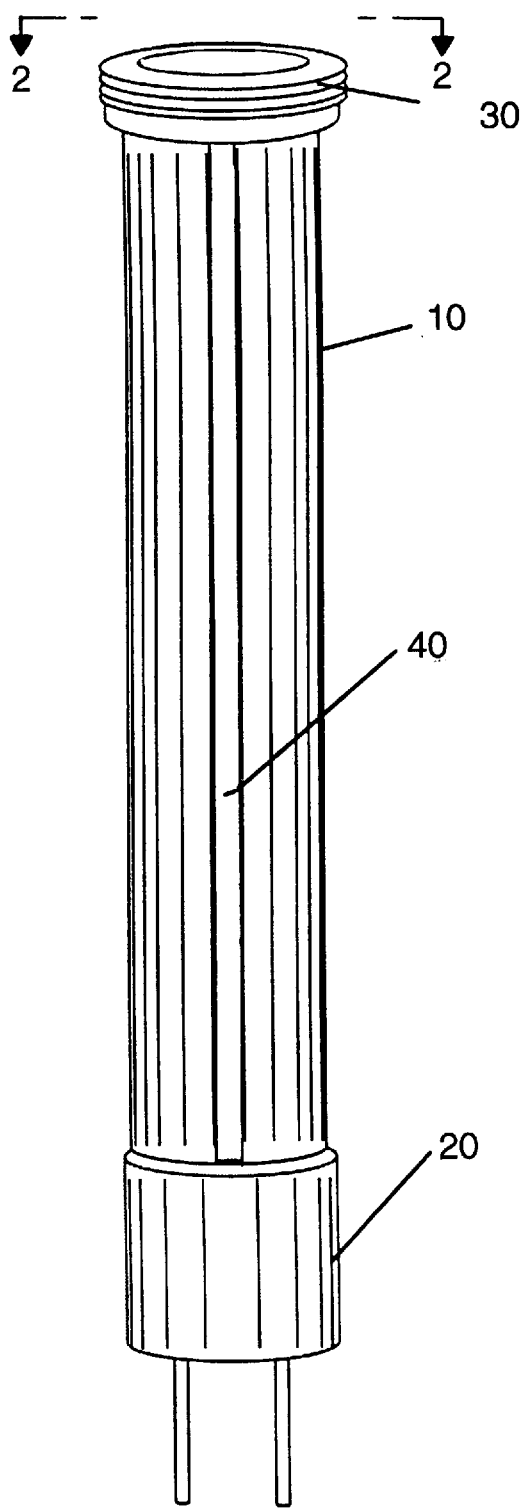
FIG. 1 depicts a male connector assembly of the invention.

FIGS. 1 depicts a male connector assembly of the invention designed for use in a superconductive NMR probe assembly. Referring to FIG. 1, the male connector assembly includes an elongated sheath 10 formed from a high strength material, such as stainless steel. In the preferred embodiment, the sheath is formed from 1.125" OD×0.050" wall thickness stainless steel tubing and is 5.4" in length. The sheath is attached at one end to a base 20. The opposite end of the sheath is provided with a threaded fitting 30. A slot 40 is cut the length of the sheath 10 to provide a guide for insertion of a key attached to the female connector assembly.

Figure 2:
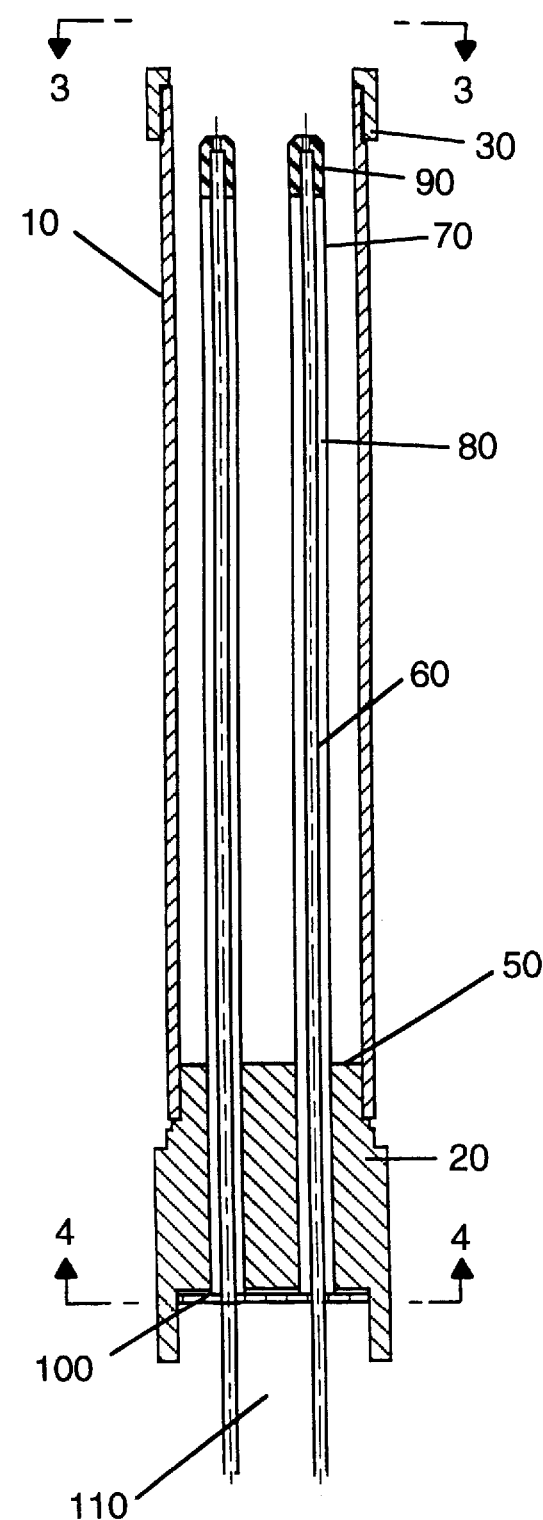
FIG. 2 depicts a longitudinal sectional view of the connector of FIG. 1.

FIG. 2 depicts a longitudinal section of the male connector assembly of FIG. 1. The base 20 has a flat surface 50 on the side facing the space enclosed by the sheath. A pair of fluid transfer tube assemblies are positioned within the sheath. Each fluid transfer tube assembly comprises an inner tube 60 and outer tube 70. The outer tube 70 is fabricated from a low thermal conductivity material and is sealed, preferably welded, to the base 20. In the preferred embodiment, the outer tube is 0.187" OD×0.010" wall thickness stainless steel, but any material having low thermal conductivity and sufficient mechanical strength and flexibility may be used. The inner tube 60 is of a sufficiently narrower diameter than the outer tube 70 that, when concentrically positioned with respect to the outer tube, a vacuum space 80 is created. In the preferred embodiment, the inner tube is 0.062" OD×0.010" wall thickness. The tubes are joined together at the end distal from the base by a solid stainless steel reduction bushing 90 brazed onto the tubes to form a vacuum-tight seal. The inner tube 60 extends through the base 20 and continues beyond. The inner tube 60 is secured in a concentric position relative to the outer tube 70 by a low thermal conductivity clip 100 which is secured to the base. G-10 or stainless steel are suitable materials for the clip. The area 110 beyond the distal side of the base is a vacuum region through which the inner tubes run. Vacuum region 110 is contiguous with vacuum region 80. Typically, flexible vacuum tubing (not shown) is attached to the base and to the source of the circulating fluid. However, it is within the scope of the invention to fashion the vacuum space from appropriate rigid or flexible materials.

Figure 3:
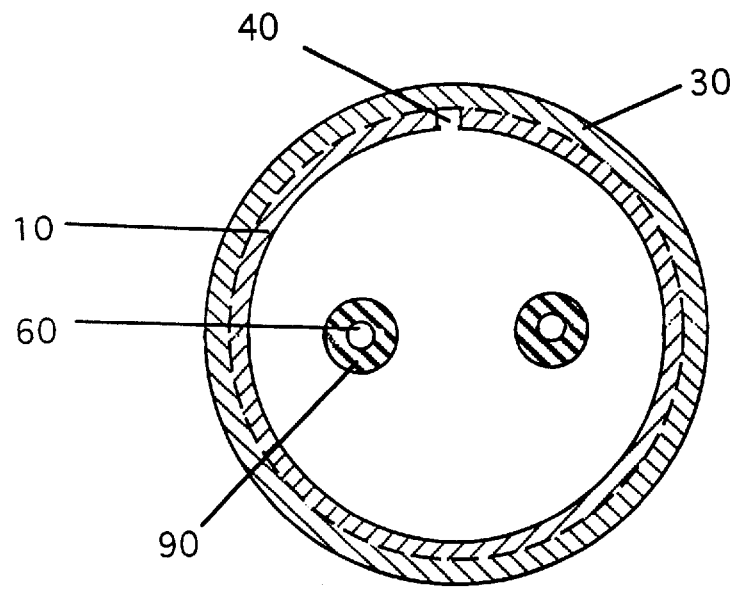
FIG. 3 depicts a top view of the assembly of FIG. 1 viewed down along sectional line A—A.

FIG. 3 depicts a view looking down on the male connector from line A—A. In FIG. 3, it can be seen that the slot 40 is 90° from a line bisecting the inner tubes.

Figure 4:
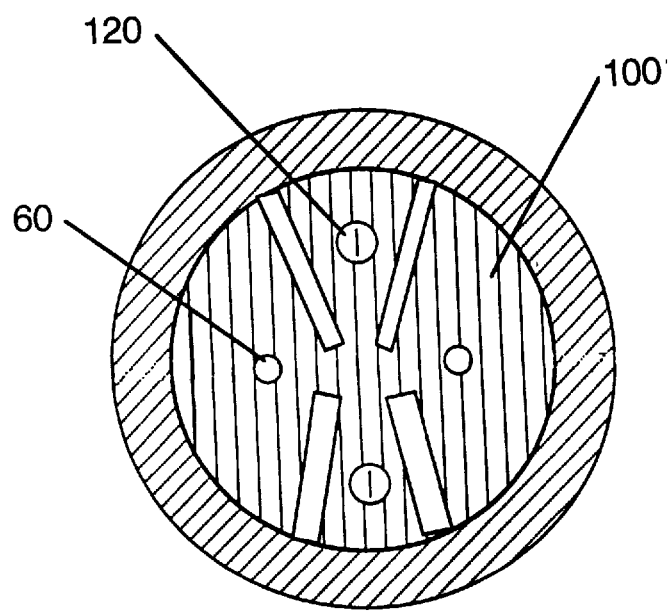
FIG. 4 depicts a bottom view of the assembly of FIG. 1 viewed up along sectional line B—B.

FIG. 4 depicts a view looking up from line B—B. The inner tubes 60 extend through the clip 100 which is held in place by fasteners 120. The fasteners may be screws, or any other device capable of maintaining the position of the clip. The clip is made of a low thermal conductivity material, such as stainless steel or fiberglass. Slots may be cut in the clip to increase the thermal path between the room temperature fastener and the inner tubes, thereby reducing thermal conductance and parasitic heat load.

FIG. 5 depicts a female connector assembly of the invention. A vacuum cylinder 150 contains the receptacle tubes 160 for the fluid transfer, which extend through a face plate 170. The receptacle tubes are made from a low thermal conductivity material. A protrusion on the outside of the cylinder 180 forms a key for guiding the joining of the male to the female connectors. In use, the key slides along slot 40. A nut 190 is provided for securing the female connector to the male connector at the threaded fitting 30 shown in FIG. 1. The nut is retained by a stop 200 on one side and a spring clip 210 on the other side.

FIG. 6 depicts a longitudinal section of the female connector assembly of the invention. A vacuum space 220 is defined by the cylindrical vacuum wall 150 and a face plate 170. The vacuum space is contiguous with a vacuum region 230 of the object to which the connector is attached. In the example of the NMR probe, the vacuum space is a rigid space provided by the probe body. However, it is within the scope of the invention to fashion the vacuum space from appropriate rigid or flexible materials. Generally, flexible vacuum tubing will be used for one or both of the connector halves to facilitate connection.

The female connector contains a pair of receptacle tubes 160 within the vacuum space 220 for insertion of the outer tubes of the male connector assembly. The receptacle tubes of the example have a diameter of 0.250" OD×0.010" thick. The receptacle tubes extend through and are flush with the surface of the face plate 170. The receptacle tubes are sealed to the face plate to provide a vacuum-tight connection. Grooves 240 for o-rings are around each of the receptacle tube openings in the room temperature face plate 170.

Figure 7:
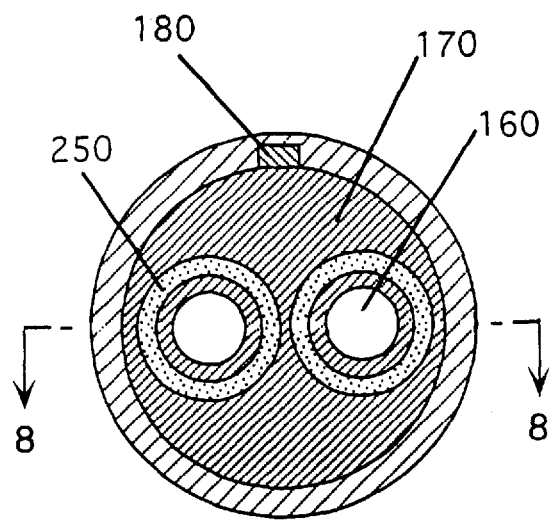
FIG. 7 depicts a top view of the assembly of FIG. 6.

FIG. 7 depicts a cross-sectional view of the female connector assembly taken along line C—C. In FIG. 7, it can be seen that the o-rings 250 are separated from the end of the cold receptacle tube 160, and are in contact with the face plate, which is at or near ambient temperature.

Figure 8:
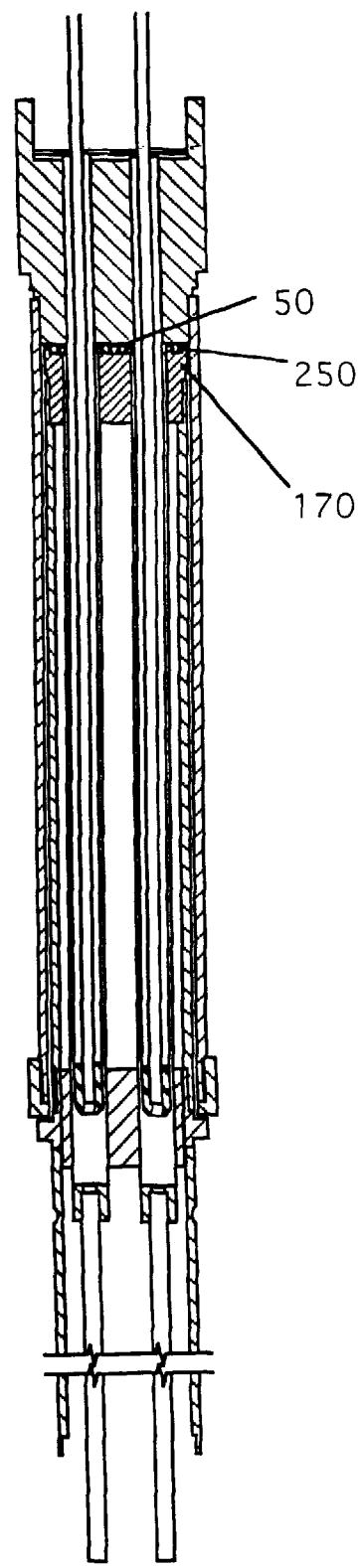
FIG. 8 depicts a longitudinal sectional view of an assembled connector.

FIG. 8 depicts a longitudinal section of an assembled connector of the invention. The nut and spring clip have been omitted for clarity. The slot and key are not illustrated. In use, the key is aligned with the slot, and the male assembly is inserted until the inside surface of the male base 50 contacts the o-rings 250. The nut is then used to compress the o-rings and form a seal around each receptacle. The fluid lines are optionally purged with a noncondensible gas, typically helium. This may be accomplished by repetitive evacuation and filling with the cryogen or by pressurizing with a clean gas of the cryogen and venting. Next, the flow of the cryogen (or heated fluid) is turned on and the fluid allowed to circulate To disconnect, the cryogen flow is first turned off. The connector is warmed to room temperature, the nut unscrewed, and the connector halves slid apart.

Figure 9:
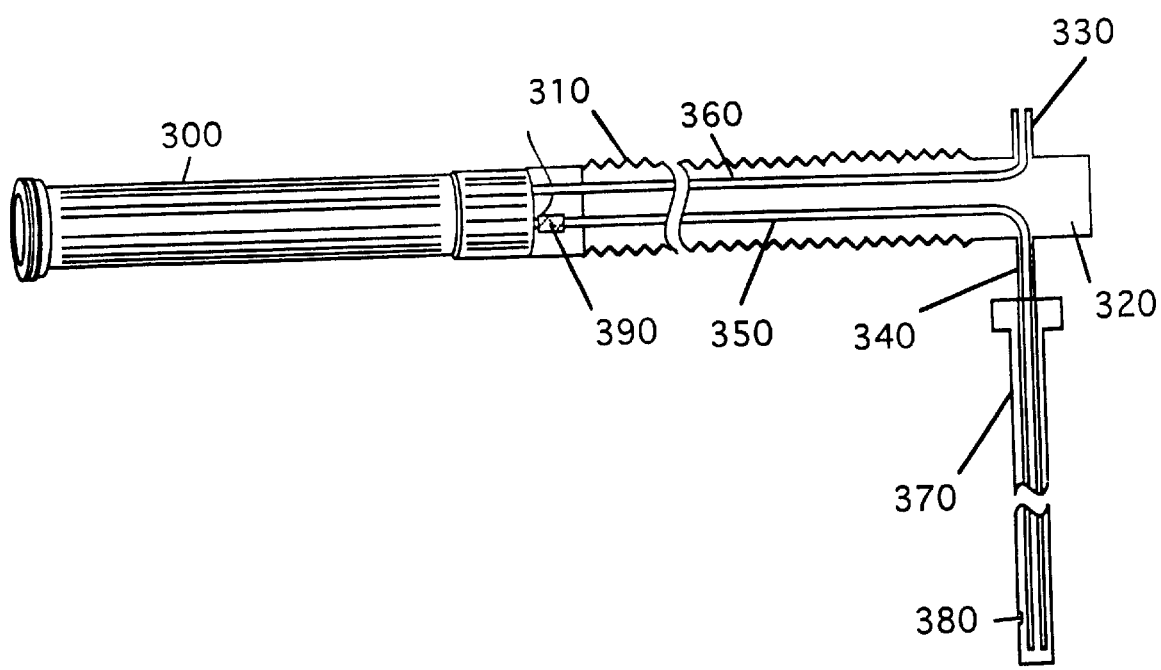
FIG. 9 depicts an embodiment of the invention in an open-cycle configuration.

It is sometimes desirable in an open-cycle cooling system to circulate fluids. either liquids or gases, back to the location of fluid reservoir for venting. FIG. 9, not drawn to scale, depicts a cross section of a male assembly component of an embodiment of the invention adapted to open-cycle use. The bayonet assembly 300 is as described for FIGS. 1–4. A flexible vacuum line 310 connects the male assembly 300 to a junction box 320, from which extend an exhaust vent extension 330 and a supply tube extension 340 of sufficient length to reach into a dewar. The space defined by the bayonet assembly, vacuum line assembly, junction box, exhaust vent extension and supply tube extension is tightly sealed and under vacuum. A supply tube 350 and an exhaust tube 360 extend from the bayonet to junction box, at which point they separate, with the exhaust tube traveling through the exhaust vent extension and forming a vacuum seal therewith. The supply tube turns extends to the lower end of the supply tube extension, and is sealed to the extension. A flow controller 370 is fitted over the supply tube extension. The flow controller is closed at the bottom, and has an opening 380 for cryogen to flow through and into the supply tube. A conventional arrangement of a slot and screw fitting provides flow control. The assembly also provides a heater 390 on the supply tube for controlling the temperature of the cryogen.

In use, cryogen flows from a storage dewar through the opening 380 in the flow controller, through the supply tube 350 to the bayonet connector where its temperature may be adjusted with the heater 390. From there it flows to the object to be cooled and returns through the exhaust tube 360 and vents at the dewar. This arrangement provides advantages over an open cycle system lacking a return. In the open cycle apparatus of the invention, vented cryogen is isolated to a single location, that at which the dewar is vented.

Theoretical Considerations

The connector is designed for easy connection, while minimizing heat load on the cryogenic fluid. Heat transport comes from three sources: thermal conduction along the transport tubes, radiation and thermal transport via the gas within the gap along the length of the outer tube 70 of the male connector and the receptacle tube 160 of the female connector. By making the gap small and selecting materials with low emissivity, the radiative and convective losses are minimized. The dominant heat load, thermal conduction along the transport tubes is calculated from the equation:

$$Q=(\kappa A/l)\Delta T \qquad (1)$$

where Q is the heat flow, κ is the thermal conductivity, A is the cross-sectional area, l is the length, and ΔT is the temperature difference.

In the geometry of the example, in which there are two bayonets, each with two concentric 4"-long stainless steel tubes. the outer having an outside diameter of ¼" and the inner having an outside diameter of 3/16", each with a wall thickness of 0.010," the heat load would be approximately 400 mW. It is within the scope of the invention to provide different geometries and/or different materials of construction. The skilled artisan will select geometries and materials to meet the heat load requirements of the particular system in which the connector will be used.

Scope and Ramifications

The invention is applicable to any situation in which it is desired to provide a disconnect for a circulating fluid system. It is particularly useful for systems in which the fluid must be maintained at a temperature which is significantly different from ambient temperature. For example, it would be useful for circulating steam, or for circulating helium, when the system as a whole is maintained at normal room temperature. It would also be applicable to circulating fluids at or near normal room temperature when the system as a whole is maintained at extremely hot or cold temperatures.

While the above description contains many specific details, these should not be construed as limitations on the scope of the invention, but rather as an exemplification of preferred embodiments. Many other variations are possible and will no doubt occur to others upon reading and understanding the preceding description. Accordingly, the scope of the invention should be determined not by the embodiments illustrated, but by the appended claims and their legal equivalents.

What is claimed is:

1. A connector for coupling a plurality of low-temperature fluid conduits, the connector comprising:

a female connector assembly comprising a vacuum cylinder having a first joining surface on an end and a plurality of essentially hollow receptor tubes, the tubes being laterally adjacent outside one another within the vacuum cylinder, and each tube having an opening extending through the first joining surface; and a male connector assembly comprising a plurality of vacuum-insulated hollow tubes that may be inserted into the female receptor tubes to create a plurality of flow paths, and a second joining surface that seals against the first joining surface such that a fluid tight seal is formed between the connector and an ambient environment.

2. The connector of claim 1 further comprising alignment apparatus that compels a predetermined rotational alignment between the female connector and the male connector when the connectors are joined together.

3. The connector of claim 2, wherein the alignment apparatus comprises a sheath attached to the male connector.

4. The connector of claim 2, wherein the alignment apparatus comprises a slot and key mechanism.

5. The connector of claim 1 further comprising a plurality of o-rings, each o-ring surrounding the opening of one of the receptor tubes.

6. An open-cycle gas circulation system comprising:

(a) the connector of claim 1;

(b) an elongated supply tube connected to a first hollow tube of the male connector for transporting a cryogen from a dewar to an item to be cooled;

(c) an exhaust tube extending from a second hollow tube for transporting a cryogen from an item to be cooled, said hollow tube being open at an end distal from the male connector assembly.

7. A connector for simultaneously connecting a plurality of low-temperature fluid lines, the connector comprising:

a first set of thermally-insulated hollow tubes laterally adjacent outside one another and having a fixed alignment with respect to one another; and a second set of thermally-insulated hollow tubes laterally adjacent outside one another and having a fixed alignment with respect to one another, wherein each of the tubes of the first set has an outside diameter less than an inside diameter of a corresponding one of the tubes of the second set and wherein the fixed alignments of the first and second sets allow insertion of tubes of the first set into the corresponding tubes of the second set.

8. The connector of claim 7 wherein the first set comprises two tubes and the second set comprises two tubes.

9. A open circuit gas circulation apparatus comprising the connector of claim 8, wherein a tube extending from one of said tubes of said first set comprises a vent.

\* \* \* \* \*